(12) United States Patent  (10) Patent No.: US 7,140,020 B2
McCarthy et al.  (45) Date of Patent: Nov. 21, 2006

(54) DYNAMIC MANAGEMENT OF VIRTUAL PARTITION COMPUTER WORKLOADS THROUGH SERVICE LEVEL OPTIMIZATION

(75) Inventors: Clifford A. McCarthy, Richardson, TX (US); Thomas E. Turicchi, Dallas, TX (US); Steven R. Landherr, Baton Rouge, LA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 669 days.

(21) Appl. No.: 10/206,594

(22) Filed: Jul. 26, 2002

(65) Prior Publication Data

US 2003/0037092 A1   Feb. 20, 2003

Related U.S. Application Data

(63) Continuation-in-part of application No. 09/493,753, filed on Jan. 28, 2000, now Pat. No. 6,725,317.

(51) Int. Cl.
*G06F 9/46* (2006.01)
*G06F 15/00* (2006.01)

(52) U.S. Cl. ........................................ 718/104; 712/13
(58) Field of Classification Search ................ 709/105; 718/104; 712/13
See application file for complete search history.

(56) References Cited

U.S. PATENT DOCUMENTS 5,473,773 A * 12/1995 Aman et al. ................. 718/104
5,487,170 A * 1/1996 Bass et al. ................... 710/244
5,675,739 A    10/1997 Eilert et al.
6,587,938 B1 *  7/2003 Eilert et al. ................... 712/29
6,721,568 B1 *  4/2004 Gustavsson et al. ........ 455/450

FOREIGN PATENT DOCUMENTS

EP  1 091 296  4/2001

OTHER PUBLICATIONS

U.S. Appl. No. 09/493,753, McCarthy et al.
U.S. Appl. No. 09/562,590, Bouchier et al.
Govil K. et al: "Cellular Disco: Resource Management using Virtual Clusters on Shared-Memory Multiprocessors" Operating Systems Review(Sigops), ACM Headquarter. New York, US, vol. 33, No. 5, Dec. 1999, pp. 154-169.
"Partitioning for the IBM eserver pSeries 690 System" IBM White Paper, 2001, page complete 12.
European Search Report issued for EP 03 25 3723 dated Jul. 19, 2005.

* cited by examiner

*Primary Examiner*—Meng-Al T. An
*Assistant Examiner*—Camquy Truong

(57) ABSTRACT

The present invention is directed to a system and method for managing allocation of a computer resource to at least one partition of a plurality of partitions of a multiple partition computer system, the system comprising: a plurality of work load managers, with one work load manager associated with each partition of the plurality of partitions, wherein each work load manager determines a resource request value for the computer resource based on at least one priority assigned to its partition associated with the computer resource; and a partition load manager that is operative to form an allocation value for each respective partition based on a respective resource request value; wherein the system apportions the computer resource among the plurality of partitions based on the allocation values.

20 Claims, 5 Drawing Sheets

| REQUESTS | | CUMULATIVE ALLOCATIONS OF 19 RESOURCES | | | | | |
|---|---|---|---|---|---|---|---|
| PARTITIONS | PRIORITY | BOX 316 | PRIORITY | | | | |
| | 1 2 3 4 | | 1 | 2 | 3 | 4 (1) | 4 (3) |
| 1 | 1 1 1 3 | 1 | 1 | 1 | 1 | 1 | [3] |
| 2 | 0 3 4 5 | 1 | 1 | 3 | 4 | 4 | 4 |
| 3 | 2 4 4 4 | 1 | 2 | 4 | 4 | [4] | 4 |
| 4 | 0 0 0 3 | 1 | 1 | 1 | 1 | 1 | [3] |
| 5 | 2 3 4 5 | 1 | 2 | 3 | 4 | 4 | 4 |
| 6 | 1 1 1 1 | 1 | 1 | 1 | 1 | [1] | 1 |
| CUMLATIVE TOTALS | 6 12 14 21 | 6 | 8 | 13 | 15 | 15 | 19 |
| | | 401 | 402 | 403 | 404 | 405 | 406 |

| REQUESTS | | CUMULATIVE ALLOCATIONS OF 24 RESOURCES | | | | | | |
|---|---|---|---|---|---|---|---|---|
| PARTITIONS | PRIORITY | BOX 316 | PRIORITY | | | | | |
| | 1 2 | | 1 | 2 (1) | 2 (2) | 2 (3) | 2 (4) | 2 (5) | 2 (8) |
| 1 | 1 9 | 1 | 1 | 1 | 2 | 3 | 4 | 5 | 6.5 |
| 2 | 1 8 | 1 | 1 | 1 | 2 | 3 | 4 | 5 | 6.5 |
| 3 | 4 5 | 1 | 4 | 4 | 4 | 4 | 4 | [5] | 5 |
| 4 | 1 2 | 1 | 1 | 1 | [2] | 2 | 2 | 2 | 2 |
| 5 | 4 3 | 1 | [4] | 4 | 4 | 4 | 4 | 4 | 4 |
| CUMLATIVE TOTALS | 11 27 | 5 | 11 | 11 | 19 | 16 | 18 | 21 | 24 |
| | | 408 | 409 | 410 | 411 | 412 | 413 | 414 | 415 |

R1=3.5     S1=R1+0=3.5 → 4        R1'=S1-0=4
R2=3.5     S2=R1+R2=7.0 → 7       R2'=S2-S1=3
R3=3.0     S3=R1+R2+R3=10.0 → 10  R3'=S3-S2=3

R1=10.1    S1=R1+0=10.1 → 10           R1'=S1-0=10
R2=20.2    S2=R1+R2=30.3 → 30          R2'=S2-S1=20
R3=30.3    S3=R1+R2+R3=60.6 → 61       R3'=S3-S2=31
R4=39.4    S4=R1+R2+R3+R4=100.0 → 100  R4'=S4-S3=39

DYNAMIC MANAGEMENT OF VIRTUAL PARTITION COMPUTER WORKLOADS THROUGH SERVICE LEVEL OPTIMIZATION

CROSS-REFERENCE TO RELATED APPLICATIONS

The present application is a continuation-in-part of U.S. application Ser. No. 09/493,753 entitled "DYNAMIC MANAGEMENT OF COMPUTER WORKLOADS THROUGH SERVICE LEVEL OPTIMIZATION," filed Jan. 28, 2000 and is related to U.S. Pat. No. 6,725,317 entitled "RECONFIGURATION SUPPORT FOR A MULTI PARTITION COMPUTER SYSTEM," the disclosures of which are hereby incorporated herein by reference.

TECHNICAL FIELD

This application relates in general to computer systems, and in specific to dynamic allocation of computer resources among applications.

BACKGROUND OF THE INVENTION

Computer systems inherently have limited resources, particularly CPU resources. These limited resources must be allocated among the different applications operating within the system. A prior allocation mechanism for allocating system resources to applications is a system known as Process Resource Manager (PRM) 10 as shown in FIG. 1A. It is used to partition the CPU resource 11 and various other resources among the different applications 12, 13, 14. The PRM partitions the resources into fractions of the whole, which are expressed as percentages in PRM configuration, as shown in FIG. 1B. The fractions or pieces are then assigned to groups of processes, which comprise applications. Each application would then receive some portion of the available resources.

The PRM is a static mechanism, meaning that the allocation configuration is fixed by an administrator, and can only be changed by an administrator. In other words, the administrator specifies where the partitions should lie, i.e., what percent of the machine goes to application 12, application 13, and application 14. This information is fixed, so it cannot respond to changes in the needs of the different applications. For example, one application may be mostly idle, but occasionally has a large amount of work to do. Under the static mechanism with fixed entitlements, this application would be allocated a smaller fraction of the CPU resources, as a larger fraction can not be justified because of the large amount of idle time. Consequently, when the large amount of work is received, then the application's performance will suffer because of its low entitlement. Therefore, the transactions will take longer to process. Another example is where a transaction requires large amounts of resources for extended periods of time, but also has periods of idle time. Under the static mechanism with fixed entitlements, this application would be allocated a larger fraction of the CPU resources. Consequently, when this application is idle, other applications' performances will suffer, as this application is assigned a large amount of resources that are not being used, and thus are not available for other applications. Therefore, the other transactions will take longer to process. Thus, this mechanism cannot handle changes in the requirements of the different applications.

Another problem is the partitioning of the resources by the administrator. The administrator has to think in terms of the actual machine resources and the requirements of the different applications. This is problematic because the resources and applications are operating at a lower level than what a person typically views. Moreover, the administrator has to have a great deal of knowledge of the application's characteristics and its resource requirements in order to determine where to set the partitions. Lack of knowledge is typically made up with guesswork. For example, an administrator may choose to set application 13 at 20% of the CPU resources. If the users of the system complain, the administrator may change the value later on.

An alternative mechanism is taught in U.S. Pat. No. 5,675,739 by IBM, which is hereby incorporated by reference. The IBM mechanism uses a priority-based model to process applications. In other words, high priority applications are serviced from a queue before lower priority applications. This mechanism can change the priorities to adjust processing performance.

Such prior art mechanisms are also ineffective for multiple partition systems. Large computer systems, e.g. those with multiple processors, multiple I/O resources, multiple storage resources, etc., can be separated into partitions or protected domains. These partitions are hardware separations that place resources into separate functional blocks. Resources in one block do not have direct access to resources in another block. This prevents one application from using the entire system resources, as well as contains faults and errors. However, the partitions, once defined, are static in nature, and cannot be readily changed without operator intervention. Thus, resources cannot be readily moved from one partition to another to satisfy workload balancing.

BRIEF SUMMARY OF THE INVENTION

The present invention is directed to a system and method for managing allocation of a computer resource to at least one partition of a plurality of partitions of a multiple partition computer system, the system comprising: a plurality of work load managers, with one work load manager associated with each partition of the plurality of partitions, wherein each work load manager determines a resource request value for the computer resource based on at least one priority assigned to its partition associated with the computer resource; and a partition load manager that is operative to form an allocation value for each respective partition based on a respective resource request value; wherein the system apportions the computer resource among the plurality of partitions based on the allocation values.

DETAILED DESCRIPTION OF THE INVENTION

Figure 1A:
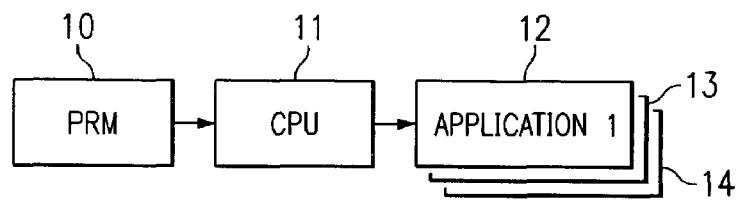
FIG. 1A depicts a prior art resource manager.
Figure 1B:
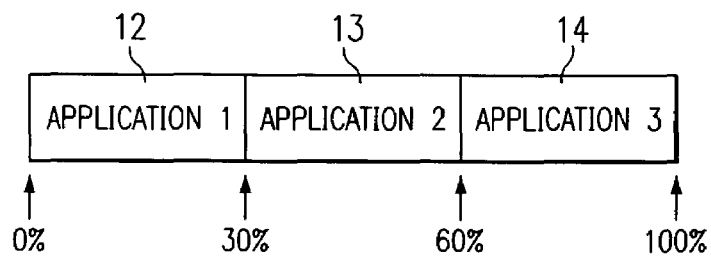
FIG. 1B depicts the portioning of the applications of FIG. 1A.

The invention dynamically responds to changes in workload characteristics in a computer system. The computer system may comprise a single small computer, e.g. a personal computer, a single large computer (e.g. an enterprise server), or a network of larger and/or small computers. The computers, particularly the large computers, or the network may be divided into protection domains or partitions. Each partition may be running its own operating system. In any event, the inventive mechanism preferably allows the administrator to think in terms of performance goals rather than computer system resources and requirements. Consequently, the administrator preferably defines a variety of performance goals with different priorities between them, and the inventive mechanism will preferably make any necessary adjustment of the resources. The goals can be preferably set without regard to partitions. For example, a goal for a database portion of the computer system could be that a retrieval transaction should not take more than 10 milliseconds. The inventive mechanism would then manipulate the resources to achieve this goal. For multiple partition computer systems, the resources may be manipulated within a partition, e.g. processor time being allocated among applications, or the resources may be manipulated between partitions, e.g. reassigning a processor from one partition to other (effectively resizing the partitions), or combination of both. Note that the resources may be located on one physical computer and are allocated to an application or partition located on another physical computer.

The inventive mechanism preferably includes a partition load manager (PLM) that receives resource request information from the partitions of the system. The PLM preferably examines the resource request information, and compares the request information with the available resources. Based on the comparison, the PLM may increase, decrease, or leave unchanged, a particular partition's resources. If the performance of a partition is lagging, e.g., if transactions are taking longer than the goals, then the partition may request an increase in the resource entitlement from the PLM. If a partition is over-achieving, then the partition may inform the PLM that it has excess resources, and the PLM may decrease its entitlement and allocate it to another partition or partitions.

Each partition preferably includes a work load manager (WLM) which operates similarly to the PLM, but operates within a particular partition. The WLM is more fully explained in U.S. application Ser. No. 09/493,753 entitled "DYNAMIC MANAGEMENT OF COMPUTER WORKLOADS THROUGH SERVICE LEVEL OPTIMIZATION," filed Jan. 28, 2000, which is hereby incorporated herein by reference. Each WLM also receives goal information and priority information from a user or administrator. Note that such goal and priority information may be the same for all partitions or the information may be specific to each partition or groups of partitions. The WLM also receives performance information from performance monitors, which are processes that monitor the performance of the applications and devices within the partition. The WLM examines the information from the performance monitors and compares the information with the goals. Based on the comparison, the WLM may increase, decrease, or leave unchanged, an application's entitlement. If the performance of an application is lagging, e.g., if transactions are taking longer than the goal, then the WLM increases the entitlement. If an application is over-achieving, then the WLM will decrease its entitlement and allocate it to another application.

The WLMs also interacts with the PLM. Each WLM initially and periodically, after determining its resource needs, sends resource request information to the PLM. The PLM, after receiving such requests, then allocates system resources between the partitions. Each WLM, after receiving information about its partitions resources, then allocates its allotted resources among the applications on its partition.

In multiple partition systems, the PLM may reside in one partition and have access to the other partitions. Alternatively, the PLM may reside in a service module that manages all of the partitions. Alternatively, the PLM may reside in each partition, and cooperatively allocate resources amongst themselves.

A partition arbiter or partition resource allocator allocates the resources between the different partitions, based on the priorities of the partitions and the resource requests. This movement of resources is referred to as re-sizing partitions. A partition, preferably through its WLM, maintains a list of prioritized application goals with an indication of the quantity of each required resource application goals of equal priority are treated equally. (Note that an application may have more than one goal.) The requests of higher priority application goals are satisfied before lower priority application goals. Unallocated resources may be held in reserve or assigned to default partition. Note that applications of the default partition may always be exceeding their goals and thus require a rule that such a condition is not an event to cause reallocation of resources or resizing of partitions.

Note that the partition resource entitlements are no longer a fixed configuration. As a partition's needs change, the invention will automatically adjust partition entitlements based resource availability and priority. Thus, the invention is dynamic. Also note that the administrator no longer has to estimate the initial entitlements as the invention will determine the correct resource allocation to achieve the stated goals, and the computer system using the invention will converge on certain partition entitlement values that achieve the stated performance goals. Further note that priorities can be assigned to the different goals. Consequently, different goals can be met based on system resources, e.g., with a high amount of resources, all goals can be met, however, with a lesser amount of resources the higher priority goal will be met before the lower priority goals. Further note that changes to the system can be made as soon as the PLM receives resource requests, and action by the system administrator is not required. Note that in multiple partition systems, the administrator may define and prioritize goals that apply across all of the partitions and the different operating system instances operating in the partitions, instead of only being applied within a single partition.

Figure 2A:
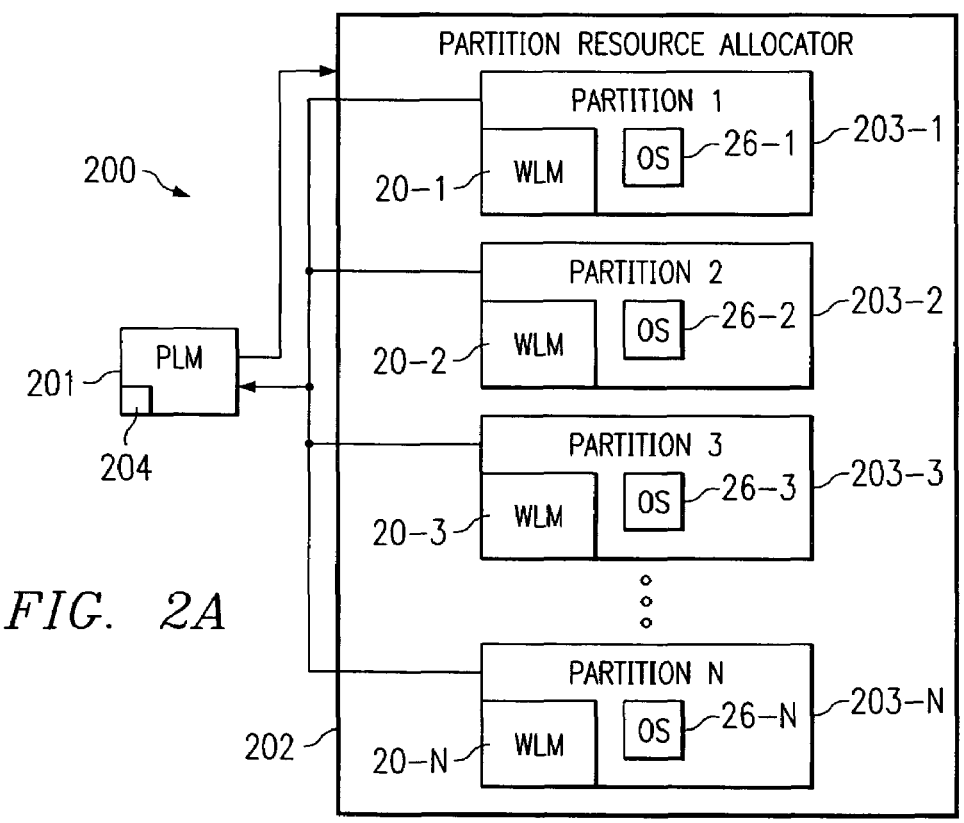
FIG. 2A depicts the inventive partition load manager (PLM) operating with a plurality of partitions.

FIG. 2A depicts the various components of the invention in a multiple partition system having multiple partitions 203-1, 203-2, 203-3 . . . 203-N. Each partition may have one or more processors and other systems resources, e.g. storage devices, I/O devices, etc. Each partition is preferably running its own operating system 26-1, . . . 26-N, which provides segregation and survivability between the partitions. Note that the different partitions may have different amounts of resources, e.g. different numbers of processors. Also note that the partitions may be virtual, as the multiple partitions may reside in one or more physical computers.

Note that in an initial state the system may have the resources evenly divided among the partitions. Alternatively, the initial state of the system may provide only minimal resources to each partition, with the extra resources being held in reserve, for example, either unassigned or all placed into one or more partitions. The operations of the PLM and the WLMs will cause the system resources to be quickly allocated in a manner that is most efficient to handle the defined goals and priorities for the applications of each of the partitions.

The resources of the computer system are managed by PLM 201. The PLM 201 receives resource requests from the different partitions. The requests can involve multiple priorities and multiple types of resources. For example, a request may state that the partition requires two processors and one storage device to handle all high priority applications, four processors and two storage devices to handle all high and medium priority applications, seven processors and five storage devices to handle all high, medium, and low priority applications. The requests originate from the WLMs 20-1, ... 20-N. The WLMs preferably produce the requests after totaling the resources necessary to activate their respective goals. After receiving one or more requests, the PLM preferably reviews system resources and determines if reallocation is necessary based on existing resources, current requests, and the priorities of the requests. Thus, if a particular partition has a change in resource requirements, the PLM will examine the existing requirements of the other partitions with the new requirements of the particular partition, as well as the current resources, to determine if reallocation is necessary. The PLM may also initiate reallocation after a change in system resources, e.g. a processor fails, or additional memory is added, etc.

The PLM preferably determines whether reallocation is necessary by examining the priorities of the resource request. A change in a high level request will typically cause reallocation. For example, if all device resources are consumed in handling high priority operations of the partitions, then a change in a low priority request would be ignored. On the other hand, a change in a high priority request, e.g. less resources needed, will cause reallocation of the resources, e.g. the excess resources from the oversupplied partition would be re-allocated among the other partitions based on the goals and priorities of their applications. The PLM then calculates a revised distribution of resources based on the goals and priorities of the applications of different partitions. The revised distribution is then delivered to partition resource allocator 202. Allocator 202 preferably operates to resize the partitions, which is to move resources from one or more partitions to one or more partitions based on the instructions provided by the PLM 201. An example of such an allocator, and partition resizing is described in U.S. Pat. No. 6,725,317 entitled "RECONFIGURATION SUPPORT FOR A MULTI PARTITION COMPUTER SYSTEM," the disclosure of which is hereby incorporated herein by reference.

Note that resizing may cause considerable overhead to be incurred by the system. In such a case, moving resources from one partition to another reduces the available computing time. Thus, determination by the PLM may include a threshold that must be reached before the PLM begins reallocation. The threshold may include multiple components, e.g. time, percent under/over capacity, etc. For example, a small over/under capacity may have to exist for a longer period of time before reallocation occurs, while a large over/under capacity may cause an immediate reallocation. This would prevent small, transient changes in resource need from causing reallocations in the system.

Figure 2B:
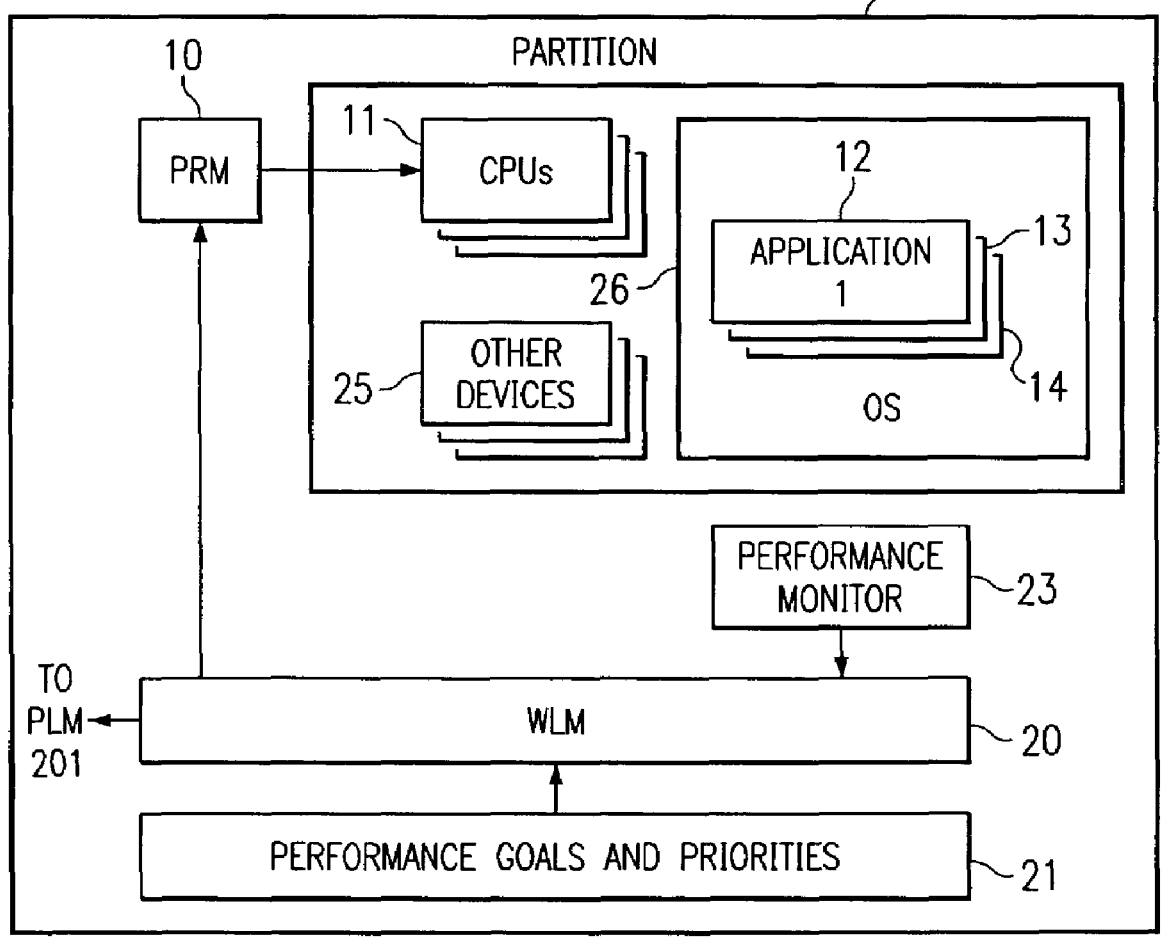
FIG. 2B depicts a partition of FIG. 2A.

FIG. 2B depicts the various components of a partition of the inventive system, which includes performance goals and priorities 21. Goals 21 preferably comprises a configuration file, which is defined by a user or system administrator, that describes the users preferences with regards to what characteristic(s) of the application is of interest and is being measured, what is the desired level of performance of the application in terms of the characteristic, and what is the priority of achieving this goal. A user can also specify time periods for a particular goal to be in effect. For example, a first application may be a first database and the user will specify in the configuration file that the characteristic is for a particular type of transaction to be completed within two seconds, and have a high priority. The application may also have a second goal for the same characteristic, e.g. the same type of transactions are to be completed within one half of a second, and have a low priority. A second application may be a second database which has a similar goal as that of the first database, namely for a particular type of transaction to be completed within two seconds, and have the same priority as the first database. Thus, resources would be allocated between the two applications, so that the high priority goals will be met, and any excess resources would be given to the first application so that it can meet the lower priority "stretch" goal.

The WLM 20 preferably receives performance information which describes the status of a particular characteristic or characteristics of each application 12, 13, 14 that is being monitored. The WLM 20 also receives performance information which describes the status and/or other characteristics of the processors 11 and other devices 25 (e.g. I/O, storage, etc.) contained within partition 208.

The performance information is preferably supplied by performance monitor 23. As shown in FIG. 2B, a single monitor is capable of handling multiple applications and devices, however, a different embodiment of the present invention may have multiple monitors, each monitoring one or more applications and devices. Performance monitor 23 is a small program that gathers specific information about the application and/or device. For example, if the application is a database, then a performance monitor measures access times for the database. As another example, if a device is a hard drive, then the performance monitor may measure data capacity. The information need not be strictly application performance; it can be any measurable characteristic of the workload (e.g. CPU usage). This information is being gathered continuously while the system is operating. The workload manager will sample the information at some interval specified by the administrator.

The output of the workload manager, derived from the ongoing performance reported by the monitors and given the goals by the user, is preferably periodically applied to the PRM 10. The output of WLM 20 is the share or entitlement allocation to the different resources that is assigned to each application. For example, each share may approximately equates to $\frac{1}{100}$ of a CPU operating second. Thus, within a second, an application having an entitlement of 10 will receive $\frac{1}{10}$ of the second, provided that the application has at least one runable process. Note that the time received may not be consecutive, but rather may be distributed across the one second interval. Note that a share may also equate to other parameters based on the resource being allocated, e.g. a percent of disk storage space or actual number of bytes of disk storage space.

The partition may have multiple numbers of resources, e.g. multiple CPUs and/or multiple storage devices. Thus, the allocation can be placed all on one device or spread among the devices. For example, a ten percent processor allocation in a four processor system could result in forty percent of one processor, ten percent of each processor, twenty percent of two processors, or some other allocation. The allocation among the different devices is determined by the PRM 10. The PRM will move the application around to various devices, as needed to attempt to ensure that it achieves ten percent. Therefore, if the application has only one runable thread, so that it can only execute on one CPU, then PRM will attempt to give it 20% of one CPU (on a two CPU system), so that is 10% of the total universe of CPU availability that is out there. Multi-threaded applications can be assigned to more than one CPU. The allocation allows the application to perform its programmed tasks. How fast and efficient it performs its tasks is a reflection of how much CPU time it was allocated. The less CPU it is allocated, the less it will perform in a time period. The more CPU it is allocated, the more it will perform in a time period. The performance monitor will measure its performance, which will be sampled by the WLM, thus completing the feedback of the system.

The WLM 20 also preferably sends resource requests to the PLM 201. These requests may take the form of a list that describes the resources required for partition 208 to meet its goals for its different priorities. The PLM may then decide to reallocate resources based on a request. The PLM may store the different requests, which would permit the PLM to view the changes in the requested resources. This would allow the PLM to anticipate changes in resources. For example, over a period of time, the PLM may realize that a particular partition always has a need for more resources at a particular time (or following a particular event), e.g. at four p.m., and thus the PLM may reallocate resources to that particular partition before the partition sends a request. The storing of requests would also allow for the setting of reallocation triggering criteria. A simple trigger could be used that compares a single message with the current resource allocation, e.g. a requested increase/decrease of 5% or greater of the current allocation resources would trigger reallocation. More complex triggers could be used that refer to the stored messages. For example, requests from a particular partition for increase/decrease of 2% to <5% of the current allocation resource that continue for more than one hour will cause reallocation.

Figure 3:
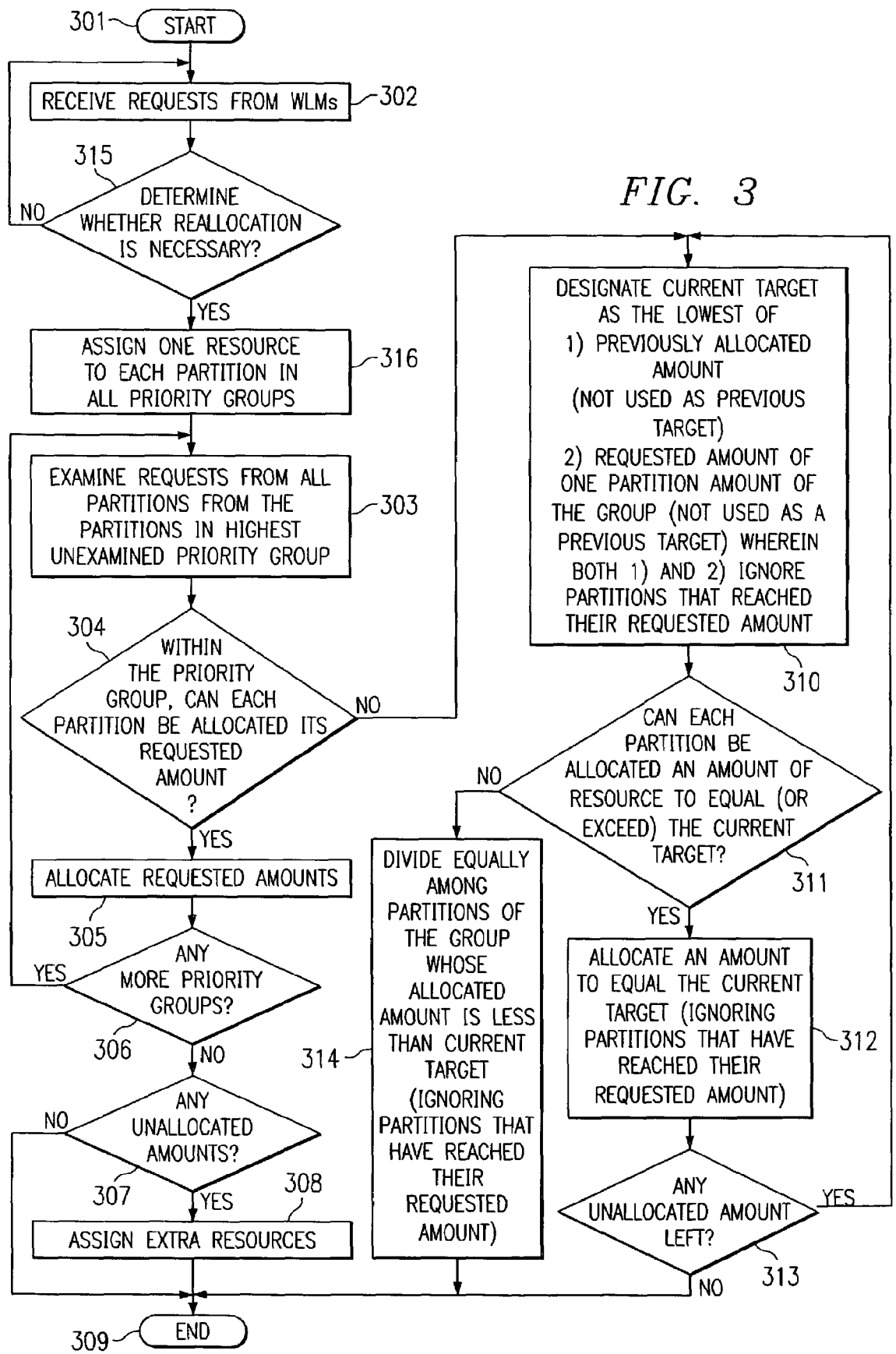
FIG. 3 depicts a flow chart of the operations of the PLM of FIG. 2A.

PLM 201 operates according to the flow chart 300 of FIG. 3. The PLM starts 301 by receiving 302 the resource requests from the WLMs. The PLM then optionally determines whether to initiate reallocation 315. The PLM may compare the resource requests with the current allocations. If a particular partition has a request for more or less resources that exceeds a predetermined threshold, as compared with a current allocation, then the PLM may initiate reallocation. Also, the PLM may compare a plurality of such requests from each partition, which have been accumulated over time, to determine whether there is a chronic overage/ underage of resources. For example, suppose a difference of 10% between requested resources (either overage or underage) and current resources will cause an immediate reallocation to occur, while a 9% difference will cause reallocation if the difference (9% or higher) occurs in two consecutive requests (or for 10 minutes), while a 8% difference (8% or higher) will cause reallocation if the difference occurs in three consecutive requests (or for 15 minutes), etc. If the PLM determines that reallocation should occur, then the PLM proceeds with box 316, and if not then the PLM returns to box 302.

In box 316, the PLM preferably assigns 301 all partitions with the value 1 (hereinafter meaning a minimal allotment of devices, e.g. one CPU, one I/O, one block of memory, etc.). The extra resources would be assigned to a default partition or held in reserve as unassigned. Alternatively, the PLM may evenly divide up the resources between the partitions.

In box 303, the PLM then preferably examines the requests for resources needed to handle the highest application priority group of the partitions. It determines 304 whether the requested amount for each partition within the priority group can be satisfied. If so, then the PLM facilitates allocation 305 of the requested entitlement by sending the allocation information to the partition resource allocator 202. Note that several messages may be sent, with one or more for each application priority level and/or partition. Alternatively, one message may be sent at the end 309, which lays out the complete allocation of the resources for all partitions. If not, then the PLM preferably arbitrates between the different partitions in a fair manner, as discussed in step 310. After satisfying each partition with the application priority group in step 305, the PLM then determines 306 whether there are any more application priority groups. If so, then the PLM returns to step 303 and repeats. If not, then PLM determines 307 whether any unallocated resources remain. If not, then the PLM is finished 309. The allocated resource information is sent to the partition resource allocator, and the PLM is finished for this iteration. After receiving new requests, the PLM will begin again in step 301. If step 307 determines that resources are available, then the PLM may assign the remaining resources to a default partition, designate the resources as unassigned and hold them in reserve (hoarding), or divide the remaining resources equally among one or more of the partitions. Note that hoarding may allow the invention to operate more properly, as the assignment of extra resources may cause the partitions to over achieve their respective goals, and consequently cause further reallocations, unless a rule is used to prevent such reallocations. Then the PLM ends 309.

If the PLM determines in step 304 that the requested amount for each partition within the application priority group cannot be satisfied, then the PLM preferably arbitrates between the different partitions in a fair manner. For example, by designating 310 a current target value as the lowest value of (1) the lowest of any previously allocated amounts, wherein the previously allocated amounts have not been previously used for a target value, or (2) the lowest requested amount of one partition of the priority group, which has not been used for a previous target value. Note that criteria (1) and (2) do not include partitions that have reached their requested amounts, as this will simplify the performance flow of the PLM as depicted in FIG. 3 (namely, by reducing the number of times that steps 310, 311, 312, and 313 are repeated). Then the PLM determines whether the target amount for each partition within the application priority group can be satisfied. If not, then the allocation amount may be equally divided 314 among different partitions of the application priority group whose allocations are less than the current target, but excluding partitions that already met or exceeded the target level. The PLM then ends 309. If so, then the PLM allocates 312 sufficient resources to bring the resource allocation value of each partition up to the target level. Partitions that already meet or exceed the target level are not changed. The PLM then determines 313 whether any unallocated resources remain. If not, then the PLM ends 309. If so, then the PLM returns to step 310 to determine a new current target level and repeats the process until the PLM ends 309.

Note that the distribution of box 314 is by way of example only, as the remaining amount may be held in reserve and/or otherwise unallocations be assigned to a default partition(s), or allocated to one or more partitions according to another rule.

Figures 4A, 4B, 5A:
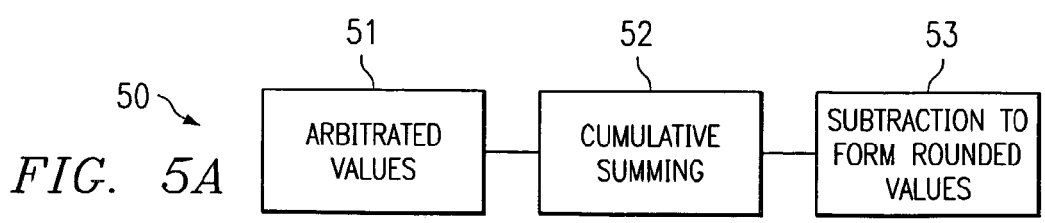
FIGS. 4A and 4B depict examples of allocation of resources by the PLM of FIG. 2A.
FIGS. 5A, 5B, and 5C depict the operation of the rounder of the PLM of FIG. 2A.

FIG. 4A depicts an example of the operation of the PLM 201. As shown in FIG. 4A, there are six partitions that have different requirements for four levels of priority. Note only one resource type is shown for simplicity as different types of resources exist, and each partition may have different requirements for the different types of resources. As shown, partition 1 requires 1 resource to handle priority 1 applications or processes, as well as priority 2 and 3 applications or processes, and 3 resources to handle priority 4 applications or processes. The other partitions have their requirements as shown. These resources can be a single processor, a group of processors, I/O devices, memory (e.g. RAM, ROM, etc.), storage devices (optical discs, hard drives, etc.), connection bandwidth to other devices and/or systems (e.g. Internet, intranet, LAN, WAN, ethernet etc.), etc, but also may be any device, application, program or process that can be allocated between and/or among different one or more partitions of a multiple partition system.

Note that the values used to express the requirements are shown as incremental values of the resources by way of example only, as other values could be used. For example, for storage devices (RAM, ROM, hard drives, etc.), the requirements could be shown as megabytes, or as a number of hard drives. Processors could be shown as percentages, shares, or as normalized values. Note that some computer systems may be able to use fractional values, with resources being split between partitions. If the computer system cannot handle fractional values (no splitting resources), then rounding errors or inequities may occur in the allocation of the resources.

FIG. 4A also depicts the allocation operation of the PLM, as shown in FIG. 3 on the requests. Note that the total needed for all priorities of all the partitions is 21, while a total of 19 resources exists in the system. Thus, not all partitions will have their priorities satisfied. After a time period, the partitions send resource requests to the PLM, as shown in table form in FIG. 4A. The PLM then may determine that reallocation is necessary in box 315 and begins a fair allocation of the resources. Note that additional resources being added to the system, e.g. another processor is added, can also cause reallocation. Similarly, resources being removed from the system, e.g. a I/O device fails, could also cause reallocation.

The PLM begins by providing each partition with minimal resources to operation, wherein each partition is assigned 1 resource in accordance with box 316 of FIG. 3 as shown in column 401. For example, each partition must have at least one processor, a block of memory, and one I/O device to operate. The PLM may send the resource information to the partition resource allocator 202 or wait until the reallocation has completed before sending the resource information to the partition resource allocator 202.

The PLM then determines whether each partition can receive its requested resource amount for priority 1, box 304. In this case, these amounts can be allocated, as there are 13 remaining resources. As shown in column 402, partitions 3 and 5 would each receive 1 additional resource, box 305. The other partitions are satisfied from the initial allocation.

Since there are additional priority groups, box 806, the PLM repeats for priority 2. The PLM can again allocate the requested amounts, since 11 resources remain. Thus, as shown in column 403, partitions 2 and 3 would receive two more resources, while partition 5 would receive one more resource.

Since there are additional priority groups, the PLM repeats for priority 3. The PLM can again allocate the requested amounts, since 6 resources remain. Thus, as shown in column 404, partitions 2 and 5 would receive one more resource.

Since there are additional priority groups, the PLM repeats for priority 4. The PLM cannot allocate the requested amounts, since only 4 resources remain. The partitions would like for 6 more resources to be allocated. (Note that partition 4 would like a total of 3 resources and has already been allocated 1 resource, and thus only needs two more.) Therefore, box 304 would then follow the 'no' path. The previously allocated amounts for the current step are 1 and 4, while the requested amounts are 1, 3, 4, and 5. The current target would be designated as 1, which is the lowest value of a requesting partition, as well as the lowest value of a previously allocated amount. Since each partition has at least 1 resource, no additional resources are allocated in this cycle, as shown in column 405. Note that partitions 3 and 6 have reached their requested amounts. Since additional resources remain, box 313, a new target is designated, i.e. 3 (lowest target not previously used). Partitions 1 and 4 each receive additional resources, while partitions 2 and 5 remain unchanged, as shown in column 406. Note that partitions 1 and 4 have reached their requested amounts. The allocated amounts would be provided to the partition resource allocator 202 as the resource allocation information. The allocator 202 would then manipulate the resources of the partitions.

FIG. 4B depicts another example of the operation of the PLM 201, similar to that of FIG. 4A. As shown in FIG. 4B, there are five partitions that have different requirements for two levels of priority. Note only one resource type is shown for simplicity as different types of resources exist, and each partition may have different requirements for the different types of resources. As shown, partition 1 requires 1 resource to handle priority 1 applications or processes, and 9 resources to handle priority 2 applications or processes. The other partitions have their requirements as shown. Note that partition 5 needs 4 resources for priority 1, but only 3 resources for priority 2. In such a case, the higher priority request preferably is satisfied.

FIG. 4B also depicts the allocation operation of the PLM, as shown in FIG. 3 on the requests. Note that the total needed for all priorities of all the partitions is 27, while a total of 24 resources exist in the system. Thus, not all partitions will have their priorities satisfied. After a time period, the partitions send resource requests to the PLM, as shown in table form in FIG. 4B. The PLM then may determine that reallocation is necessary in box 315 and begins a fair allocation of the resources.

The PLM begins by providing each partition with minimal resources to operation, wherein each partition is assigned 1 resource in accordance with box 316 of FIG. 3 as shown in column 408. The PLM then determines whether each partition can receive its requested resource amount for priority 1, box 304. In this case, these amounts can be allocated. As shown in column 409, partitions 3 and 5 would each receive 3 additional resources, box 305. Note that partition 5 has reached its requested amount. The other partitions are satisfied from the initial allocation.

Since there are additional priority groups, box 806, the PLM repeats for priority 2. The PLM cannot allocate the requested amounts. Therefore, box 304 would then follow the 'no' path. The previously allocated amounts are 1 and 4, while the requested amounts are 2, 3, 5, 8, and 9. The current target would be designated as 1, which is the lowest value of a set comprising the requested amount and the previously allocated amount. Since each partition has at least 1 resource, no additional resources are allocated in this cycle, as shown in column 410. Since additional resources remain, box 313, a new target is designated, i.e. 2. Partitions 1, 2, and 4 each receive an additional resource, as shown in column 411. Note that partition 4 has reached its requested amount. Since additional resources remain, box 313, a new target is designated, i.e. 3. Partitions 1 and 2 each receive an additional resource, as shown in column 412. Since additional resources remain, box 313, a new target is designated, i.e. 4. Partitions 1 and 2 each receive an additional resource, as shown in column 413. Since additional resources remain, box 313, a new target is designated, i.e. 5. Partitions 1, 2, and 3 each receive an additional resource, as shown in column 414. Note that partition 3 has reached its requested amount. Since additional resources remain, box 313, a new target is designated, i.e. 8. The remaining resources cannot be allocated to meet the new target, box 311. Thus, the remaining resources are allocated according to box 314. For example, the remaining resources can be equally divided among the partitions that have not yet received their requested allocations as described in box 314. Thus, the 3 remaining resources are divided among partitions 1 and 2, with each partition receiving 1.5 resources. The allocated amounts would be provided to the partition resource allocator 202 as the resource allocation information. The allocator 202 would then manipulate the resources of the partitions.

Figures 5B, 5C, 6:
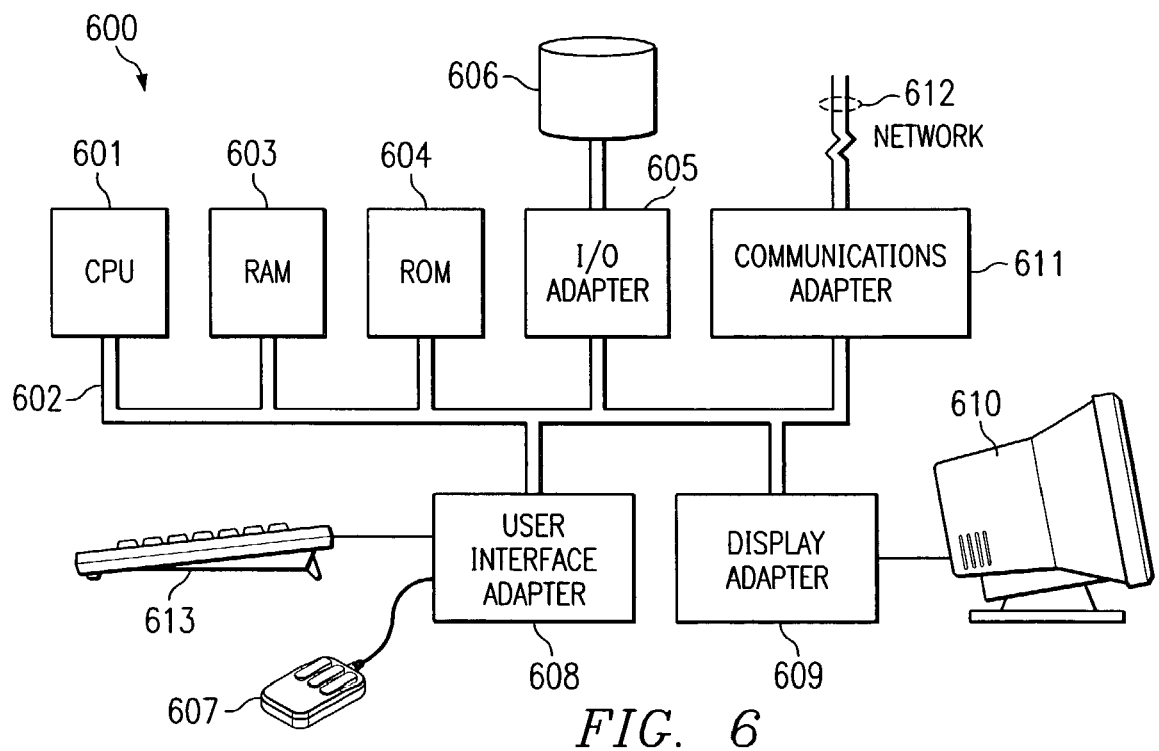
FIG. 6 depicts a block diagram of a computer system which is adapted to use the present invention.

As described above, if resource values are used that are not representative of whole resource units and the system cannot handle fractionalize units, e.g. one processor, then rounding errors may occur. The PLM would handle such errors as shown in FIG. 5A, and as illustrated in the examples of FIG. 5B and 5C. FIG. 5A depicts the operation of the rounder portion 204 of the PLM 201. The above examples have used integer values for the requests, and thus result in allocation values that are also integers, however fractional numbers or floating point numbers may be used, e.g. an allocation value of 10.1. Also, floating point numbers may also result from step 314 (for example dividing 3 resources among two partitions results in 1.5 resources for each partition. Some systems may only operate with allocated values that are integer, thus fractional values of resources will need to be rounded up or down. This is also true when allocating incremental resources such as processors, hard drives, etc., in resizing partitions where whole resources need to be allocated. The rounder 204 first receives 51 the allocated values from the PLM, which are the values resulting from the operation of FIG. 3. The rounder then cumulatively sums the values for each received allocated value by adding prior allocated values to each received allocated value. The rounder then forms the rounded allocation values by subtracting each cumulative sum with the prior cumulative sum. For example, as shown in FIG. 5B, three partitions have allocated values of $R1=3.5$, $R2=3.5$, and $R3=3.0$. The rounder forms S1 by adding R1 and 0 (note that step may be modified such that S1 is assigned the value of R1) and then rounding wherein fractional values of greater than or equal to 0 and strictly less than 0.5 are rounded down to zero and fractional values of greater than or equal to 0.5 are rounded up to one. Similarly, the rounder forms S2 by adding R2+R1 and rounding, and forms S3 by adding R3+R2+R1 and rounding. Note that any fractional values are being accumulated into the subsequent sums (before rounding), i.e. S1 has 0.5, S2 has 1.0, and S3 also has 1.0 (before rounding). The rounder forms the rounded allocated values, by subtracting the sums with the previous sum. Specifically, $R1'=S1$ (or S1-0), $R2'=S2-S1$, and $R3'=S3-S2$. Note that the rounding up occurs in the first value, as this is where the accumulated fractional value has equaled or exceeded 0.5. These rounded values would then be sent to the partition resource allocator 202.

FIG. 5C is another example of rounding, wherein four partitions have allocated values of $R1=10.1$, $R2=20.2$, $R3=30.3$, and $R4=39.4$. The rounder forms S1 by S1=R1 (or R1+0) and rounding, forms S2 by S2=R2+R1 (or R2+S1) and rounding, forms S3 by S3=R3+R2+R1 (or R3+S2) and rounding, and forms S4 through S4=R4+R3+R2 +R1 (or R4+S3) and rounding. Note that any fractional values are being accumulated into the subsequent sums (before rounding), i.e. S1 has 0.1, S2 has 0.3, S3 has 0.6, and S4 has 1.0 (before rounding). The rounder forms the rounded allocated values, by subtracting the sums with the previous sum. Specifically, $R1'=S1$ (or S1−0), $R2'=S2-S1$, $R3'=S3-S2$, and $R4'=S4-S3$. Note that the rounding up occurs in the third value, as this is where the accumulated fractional value has equaled or exceeded 0.5. Note that the rounding is order dependent. Consequently, the ordering of the partitions determines which partition will receive the rounding. For example, give the following fractional values of 0.4, 0, and 0.1, the third application with 0.1 will receiving the rounding up, as this accumulation value is the one that equals or exceeds 0.5, and not the larger fractional value of 0.4. If the partition were re-ordered to 0, 0.1, and 0.4, then the third application with 0.4 would receive the rounding. Note that rounding does not cause significant perturbations to the inventive system, i.e. causing over/under achievements of the goals, unless the allocated values are very small. In that case, increasing a small value by 1 would represent a large change in the percentage and may cause over/under achievement. For example, suppose an allocated value of 2.1 is rounded up to 3. This represents a value that is 143% larger than the allocated value. Such a large difference may cause over/under achievement.

Note that the examples depicted and described herein are for illustrative purposes only, as the invention will operate with other values.

Further note that the allocation mechanism shown in FIG. 3 and illustrated with examples shown in FIGS. 4A to 4B, is designed such that each partition having an application priority group will receive generally equal treatment. Alternatives can be developed. For example, the PLM could be programmed to attempt to maximize the number of partitions that receive their request amount. This would starve some of the partitions having applications with the same application priority group, particularly the larger requesting partitions, so that others, namely the smaller requesting partitions, will be satisfied. Another alternative is to have partitions receive an amount that is proportional to the difference between their allocated amount and their requested amount. When an application priority level is reached where there is an insufficiency in the available resources versus the requested resources, then allocating an amount that is proportional for the difference would put each partition at the same fractional point. This would minimize the number that receive the amount they are asking for because, none of the partitions would receive the whole amount they are requesting (subject to rounding), they would all be scaled by their respective differences. The advantage of the mechanism of FIG. 3 is that no partition is sensitive to any other partition (with larger requirements) at the same priority or lower priority. Note that a smaller requesting partition may reduce a higher resource partition, of equal priority, until their respective allocations become equal. If a higher priority partition starts requesting more resources, then the partitions with lower priorities will lose resources, but if a partition at the same priority starts requesting more resources, then this partition can reduce only the resources of its co-priority partitions if its entitlement is smaller than theirs. Thus, co-priority partitions are protected from each other. With the alternative mechanisms described above, a particular partitions' allocations will be affected as the request of their co-priority partitions are changing.

When implemented in software, the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, intranet, etc.

FIG. 7 illustrates computer system 700 adapted to use the present invention. Central processing unit (CPU) 701 is coupled to system bus 702. The CPU 701 may be any general purpose CPU, such as an HP PA-8200 or Intel Pentium II processor. However, the present invention is not restricted by the architecture of CPU 701 as long as CPU 701 supports the inventive operations as described herein. Bus 702 is coupled to random access memory (RAM) 703, which may be SRAM, DRAM, or SDRAM. ROM 704 is also coupled to bus 702, which may be PROM, EPROM, or EEPROM. RAM 703 and ROM 704 hold user and system data and programs as is well known in the art.

Bus 702 is also coupled to input/output (I/O) controller card 705, communications adapter card 711, user interface card 708, and display card 709. I/O card 705 connects to storage devices 706, such as one or more of hard drive, CD drive, floppy disk drive, tape drive, to the computer system. Communications card 711 is adapted to couple the computer system 700 to a network 712, which may be one or more of local (LAN), wide-area (WAN), ethernet or Internet network. User interface card 708 couples user input devices, such as keyboard 713 and pointing device 707, to the computer system 700. Display card 709 is driven by CPU 701 to control the display on display device 710.

What is claimed is:

1. A system for managing allocation of a computer resource to at least one partition of a plurality of partitions of a multiple partition computer system, the system comprising:
    a plurality of work load managers, with one work load manager associated with each partition of the plurality of partitions, wherein each work load manager determines a resource request value for the computer resource based on at least one priority assigned to its partition associated with the computer resource; and
    a partition load manager that is operative to form an allocation value for each partition based on a resource request value;
    wherein the system apportions the computer resource among the plurality of partitions based on the allocation values.

2. The system of claim 1 wherein the computer resource is selected from the group consisting of:
    a processor;
    a plurality of processors;
    memory;
    I/O resource;
    data storage medium; and
    connection bandwidth.

3. The system of claim 1 further comprising:
    a plurality of performance monitors, with at least one monitor associated with each partition of the plurality of partitions, wherein each performance monitor is associated with a characteristic of the partition.

4. The system of claim 3 wherein:
    information provided by at least one performance monitor is used by the work load manager in the determination of the resource request value for the computer resource.

5. The system of claim 1 wherein the computer system is selected from the group consisting of:
    a personal computer;
    an enterprise computer; and
    a network comprising a plurality of computers.

6. The system of claim 1 wherein an arrangement of the partition load manager is selected from the group consisting of:
    the partition load manager resides on one partition of the plurality of partitions and can access the remaining partitions of the plurality of partitions;
    the partition load manager resides on each partition of the plurality of partitions; and
    the partition load manager resides on module that distinct from the plurality of partitions.

7. The system of claim 1 wherein the partition load manager comprises:
    a rounder that uses cumulative rounding to adjust a non-integer allocation request value into an integer number.

8. The system of claim 1 wherein the partition load manager groups the resource request values into priority groups based on the priorities of the resource request values, and then forms the allocation values based on a predetermined distribution manner that is selected from the group consisting of:
    equalization of an amount of the computer resource that each partition within a priority group receives;
    maximization of the number of partitions that receive their requested amounts of the computer resource within a priority group; and
    equalization of a proportion of the allocation value and the requested amount for each of the partitions within a priority group.

9. A method for managing allocation of a computer resource to at least one partition of a plurality of partitions of a multiple partition computer system, the method comprising:
    determining a resource request value for the computer resource for each partition of the plurality of partitions, wherein the resource request value is based on at least one priority assigned to each partition associated with the computer resource;
    forming an allocation value for each partition based on a resource request value; and
    apportioning the computer resource among the plurality of partitions based on the allocation values.

10. The method of claim 9 further comprising:
determining whether forming an allocation value is necessary based on at least one resource request value.

11. The method of claim 9 wherein the step of forming an allocation value comprises:
assigning a minimal allocation value as the allocation value of the resource to each partition of the plurality of partitions associated with the resource.

12. The method of claim 9 wherein the step of forming an allocation value comprises:
grouping the resource request values into priority groups based on the priorities of the resource request values; and
(a) examining the resource request values in a highest unexamined priority group.

13. The method of claim 12 wherein the step of forming an allocation value comprises:
(b) determining whether a requested amount of the computer resource can be allocated to each partition in a highest unexamined priority group.

14. The method of claim 13 wherein the step of forming an allocation value comprises:
(c) assigning each allocation value to equal to the requested amount in the resource request value, if the requested amount of the of the computer resource can be allocated to each partition in a highest unexamined priority group.

15. The method of claim 14 wherein the step of forming an allocation value comprises:
determining whether there are other unexamined priority groups;
wherein if there are other unexamined priority groups, then repeating steps (a), (b), and (c);
if there is no other unexamined priority groups, then determining whether there are any unallocated portions of the computer resource; and
if there are unallocated portions of the computer resource, then assigning the unallocated portions of the computer resource to a default location.

16. The method of claim 15 wherein the default location is selected from the group consisting of:
a predetermined partition;
divided among the partitions associated with the resource; and
a state indicating not assigned to any partition.

17. The method of claim 13 wherein the step of forming an allocation value comprises:
forming each allocation value with the computer resource according to a predetermined distribution manner, if the requested amount of the of the computer resource cannot be allocated to each partition in a highest unexamined priority group.

18. The method of claim 17 wherein the predetermined distribution manner is selected from the group consisting of:
equalizing an amount of the computer resource that each partition within a priority group receives;
maximizing the number of partitions that receive their requested amounts of the computer resource within a priority group; and
equalizing a proportion of the allocation value and the requested amount for each of the partitions within a priority group.

19. A system for managing allocation of a computer resource to at least one partition of a plurality of partitions of a multiple partition computer system, the system comprising:
means for determining a resource request value for the computer resource for each partition of the plurality of partitions, wherein the resource request value is based on at least one priority assigned to each partition associated with the computer resource;
means for forming an allocation value for each partition based on a resource request value; and
means for apportioning the computer resource among the plurality of partitions based on the allocation values.

20. A computer program product having a computer readable storage medium having computer program logic recorded thereon for managing allocation of a computer resource to at least one partition of a plurality of partitions of a multiple partition computer system, the computer program product comprising:
means for determining a resource request value for the computer resource for each partition of the plurality of partitions, wherein the resource request value is based on at least one priority assigned to each partition associated with the computer resource;
means for forming an allocation value for each partition based on a resource request value; and
means for apportioning the computer resource among the plurality of partitions based on the allocation values.

* * * * *

UNITED STATES PATENT AND TRADEMARK OFFICE
CERTIFICATE OF CORRECTION

PATENT NO. : 7,140,020 B2 Page 1 of 1
APPLICATION NO. : 10/206594
DATED : November 21, 2006
INVENTOR(S) : Clifford A. McCarthy et al.

It is certified that error appears in the above-identified patent and that said Letters Patent is hereby corrected as shown below:

In column 13, line 14, delete "The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc." and insert -- The program or code segments can be stored in a processor readable storage medium. The "processor readable storage medium" may include any medium that can store. Examples of the processor readable storage medium include an electronic circuit, a semiconductor memory device, a ROM, a flash memory, an erasable ROM (EROM), a floppy diskette, a compact disk CD-ROM, an optical disk, a hard disk, a fiber optic medium, etc. --, therefor.

Signed and Sealed this

Twelfth Day of January, 2010

David J. Kappos
*Director of the United States Patent and Trademark Office*